Patented Dec. 1, 1953

2,661,373

UNITED STATES PATENT OFFICE 2,661,373

CERTAIN AMINO ALCOHOLS AND KETONES

Fritz Külz, deceased, late of Frankfurt am Main, Germany, by Ida Külz and Annemarie Külz, Frankfurt am Main, Walburga Külz, Essen, Stoppenberg, and Friedrich Lehmann, Frankfurt am Main, Germany, administrators of the estate of Fritz Külz, and Clemens Schöpf, Darmstadt, Germany No Drawing. Application March 2, 1953,
Serial No. 339,924

15 Claims. (Cl. 260—570.6)

This invention relates to new and useful improvements in certain amino alcohols and ketones and is a continuation-in-part of our co-pending applications Serial No. 86,123 filed April 7, 1949, now abandoned, and Serial No. 299,494 filed July 17, 1952.

One of the objects of the invention comprises among others a new and useful amino alcohol product having valuable therapeutic and pharmacological properties.

Another object of the invention comprises a novel mode of producing the amino alcohols in accordance with the invention.

A further object of the invention comprises valuable amino ketones which lend themselves readily to the preparation of the novel amino alcohols in accordance with the invention.

A still further object of the invention comprises a novel mode preparing such amino ketones.

The foregoing and still further objects of the invention will be apparent from the following description:

The novel compounds in accordance with the invention possess remarkable therapeutically valuable pharmacological properties and they broadly constitute aralkylamino alkane product of the group consisting of the acid addition salts and free base represented by the general formula for the base (p) R′O—C₆H₄—X—CH—NH—R—P
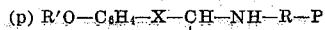
Y in which R represents an aliphatic hydrocarbon radical of from 2-5 carbon atoms, in which X is a member of the group of radicals consisting of —CO— and —CHOH—, in which R′ is a member of the group consisting of hydrogen and a phenyl methyl radical, in which P is a member of the group consisting of phenyl and a phenyl methyl radical, and in which Y is a member of the group consisting of methyl and ethyl radical.

The novel alkanol products in accordance with the invention possess an appreciable lowering effect upon diastolic blood pressure while the keto compounds in accordance with the invention, have proven valuable in the relief or treatment of asthmatic conditions. A remarkable aspect of the novel products in accordance with the invention and particularly the alkanol products, is the fact that otherwise similar products for which, however, R is less than 2, i. e. a methyl radical, show only a fraction of the effectiveness of our novel products for which R is an aliphatic radical of from 2-5 carbon atoms.

The novel alkanol products within one embodiment of the invention constitute 1-(p-hydroxyphenyl)-1-hydroxy-2-(aralkylamino) - propanes of the general formula (p) HO—C₆H₄—CHOH—CH—NH—R—C₆H₅
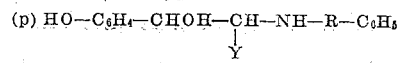
I in which R represents any substantially aliphatic hydrocarbon radical of from 2-5 carbon atoms of either straight or branched chain configuration and preferably of the latter type with the NH grouping in C linkage with an intermediate carbon atom of the radical, and by way of further preference, in linkage with a C atom at which chain branching occurs and in which Y is either the methyl or ethyl radical.

Within the preferred embodiment of the products in accordance with the invention R is, for instance, represented by an ethyl, propyl, isopropyl, butyl, isobutyl, pentyl, isopentyl, or similar radicals including where appropriate their various isomers.

The novel alkanol products in accordance with the invention may be broadly produced by reducing with hydrogen and in the presence of a catalyst either an amino ketone or the corresponding Schiff's base either as such or in the form of their salts and broadly corresponding to the general formulae (p) R¹O—C₆H₄—CO—CH—NH—R¹¹—C₆H₅
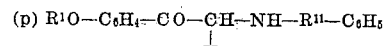
II (P) R¹O—C₆H₄—CO—CH—N=R¹¹—C₆H₅
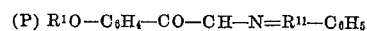
IIa in which Y represents a methyl or ethyl radical and in which R¹ represents hydrogen or any other hydrogen substitutable or convertible radical and preferably a phenyl methyl radical which will permit to be split off by hydrogenation in the presence of a catalyst to convert the R¹O-radical into an OH radical.

The above referred to ketone products may be converted to the desired amino alcohol product in accordance with the invention by reducing the ketone to a hydroxy group and suitably splitting off the radical in the p-hydroxy position to convert the same to a free OH group. The latter may be accomplished in various ways, some of which are substantially conventional and known to the artisan, and may include saponification or other ester splitting reaction, heating with mineral acids, alkali hydroxides or carbonates, etc. The ketone group may be converted to a hydroxy group in accordance with conventional practices but preferably by way of reduction with hydrogen in the presence of a catalyst. Within the scope of the preferred procedure of the invention it is possible to combine the splitting off the H-substituted radical of the hydroxy grouping by hydrogenation in the presence of a catalyst while simultaneously reducing the CO grouping to a CHOH group. If a product of the Schiff's base type is used, the —N=R— group may be converted to an —NH—R— group in accordance with conventional methods, though we prefer such conversion by way of a reduction with hydrogen in the presence of a hydrogenation catalyst and it may then be of advantage to simultaneously obtain conversion of the —N= group to —NH— and the —CO— group to —CHOH— and preferably while simultaneously splitting off the radical to convert the —OR¹ group to —OH.

The novel ketones of the above mentioned general formula (II) may be, for instance, prepared by suitable condensation of a halogeno-p-hydroxy propio or butyro phenones or esters or ethers thereof with suitable aralkyl amines. The ether groupings are preferably those of alcohol radicals which may be split off by hydrogenation, as herein set forth. Suitable aralkyl amines may be, for example, α- or β-phenylethylamine or -phenylpropylamine or α-methyl-phenylpropylamine. It is in most cases of advantage to effect the condensation by reacting the compounds together in equi-molecular quantities and preferably in the absence of solvents. Conventional condensation agents may be used to expedite or catalyze the reaction.

A suitable hydroxy propio phenone condensation with a aralkylamine of the type useful for the preparation of products in accordance with the invention (2–5 carbon atoms in the aliphatic chain) is, for instance, exemplified by the smooth reaction of equi-molecular amounts in the absence of solvents of for instance p-benzyloxy-α-bromo-propio-phenone (III) with 1-phenyl-3-amino-butane (IV) resulting in the formation of (1 - methyl-2-p-benzyloxy-phenyl-2-oxo-ethyl) - (1'-methyl-3'-phenyl-propyl)-amine (V) in accordance with the following equations:

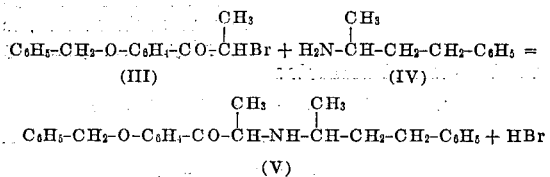

The Schiff's base of the general Formula IIa above may be converted by suitable reduction or hydrogenation to its amino hydroxy compound of the general formula

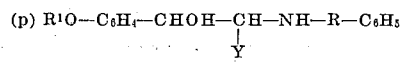

(p) R¹O—C₆H₄—CHOH—CH—NH—R—C₆H₅
                              |
                              Y                VI in which R¹ and Y are as above stated.

This product may then be treated for the splitting off of the R¹— group in the manner herein stated.

It is generally desirable in most of these condensation reactions of the type herein referred to if the hydroxy group is suitably protected such as by etherification or esterification thus resulting in ether or ester products from which it is necessary to split off the acid or alcohol radicals as the case may be in order to obtain the free hydroxy compounds in accordance with the invention.

A suitable Schiff's base as herein referred to may be conveniently obtained as exemplified by the condensation of an ester or ether (preferably hydrogenation splittable) of an 1-(p-hydroxyphenyl)-propanedione-(1.2) of the formula (p) HO—C₆H₄—CO—CO—CH₃     VII (or the corresponding butane dione as the case may be) with a suitable aralkyl amine of the type having 2–5 carbon atoms in either straight or branched chain configuration. The resulting product is a Schiff's base or aldehyde ammonia forming an intermediate product in which the ketone and =N— groups may be reduced to form a hydroxy amine of the general Formula VI above set forth. It is also possible, in accordance with the invention, to conduct the reduction of the Schiff's base in a manner to simultaneously split off the ester or ether radical to thereby convert the base directly to the desired hydroxy amine with a free phenyl hydroxy group.

By way of further alternative, the alkanol products in accordance with the invention may be obtained by suitable condensation of an aralkanolamine of the general formula

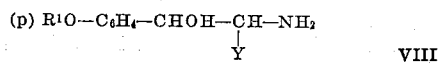

(p) R¹O—C₆H₄—CHOH—CH—NH₂
                        |
                        Y          VIII (in which R¹ and Y are as above set forth) with an aralkyl or aralkylene ketone or aldehyde such as, for instance, acetophenone, benzylacetone, benzalacetone or phenylacetaldehyde and hydrocinnamic aldehyde. The resulting products also contain a —C=N— grouping which may be reduced as, for instance, by hydrogenation. Such hydrogenation may be carried out to either successively reduce the =N— group (together with alkylene group, if any) and the phenyl ester or ether grouping or the hydrogenation may be conducted in accordance with the invention to simultaneously obtain the splitting off of the ester or ether radical to result in the formation of the free phenyl hydroxy group.

Suitable aralkanolamines of the type for instance exemplified by Formula VIII may be prepared for instance from a suitable ester or ether of a p-hydroxy-propio or butyro phenone. The latter may be converted with nitrous acid or esters thereof into the isonitroso compounds, which are then reduced. The reduction may be accomplished in successive stages or in a manner to simultaneously split off the ester or ether radical as, for instance, by catalytic hydrogenation with palladium. It is also possible to split off the ester or ether radical during or after the condensation of the aralkanolamines with the aralkyl ketone or aldehyde so that it is only necessary to reduce the resulting product for the conversion of the =N— group.

Alternatively, it is possible to produce aralkanolamines with a free unsubstituted phenyl hydroxy group such as by catalytic hydrogenation of p-hydroxy-α-amino-propiophenone or p-hydroxy-β-amino butyrophenone, as the case may be, preferably in aqueous suspension at normal temperature in either the presence of palladium catalyst at atmospheric pressure or a pressure slightly in excess of atmospheric or in the presence of nickel catalyst, such as Raney nickel, and preferably at high pressure.

By way of still further preferred embodiment of the invention, the novel alkanol compounds may be produced by hydrogenation of 1-(p-hydroxyphenyl)-2-amino-propanone-(1) (or corresponding butanone product) in organic solvents in which the same is relatively sparingly soluble, in the presence of an aromatic-aliphatic ketone or aldehyde of the general formula $$C_6H_5—R'''—CO—R''''  \qquad IXa$$

in which R''' represents an aliphatic hydrocarbon radical, R'''' a hydrogen atom or aliphatic hydrocarbon radical and in which the sum of the carbon atoms of R''' and R'''' is 1–4.

This reaction and the smooth production of the compounds in accordance with the invention in this manner is surprising, in that it should be normally expected under the conditions under which the α amino ketone is to be reacted with the aldehyde or ketone, that it would combine with itself with the formation of a double internal aldehyde ammonia compound and the subsequent splitting off of water to form a dihydropyrazine which in turn would be converted into a stable pyrazine by loss of two hydrogen atoms. The normally expected reaction resulting in the ultimate formation of pyrazine does not take place, however, in the special case of 1-(p-hydroxyphenyl)-2-amino-propanone-(1) (or corresponding butanone product) which reacts with excellent yields to form the novel compounds in accordance with the invention by its catalytic hydrogenation in the presence of a ketone or aldehyde (under Formula IX). The reaction is exemplified for the propanone by the following equation:

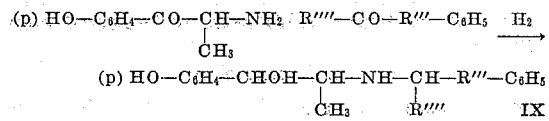

In order to carry out the reaction the aminoketone, which has been prepared in the usual manner, for example, by reacting acetoxy-α-bromo-propiophenone (or corresponding butyrophenone) with aqueous ammonia, is suspended in organic solvents in which it is sparingly soluble, the ketone or aldehyde is added in equimolecular proportions or in slight excess with respect to the amino-ketone, and the mixture is shaken in contact with hydrogen in the presence of a hydrogenation catalyst at atmospheric pressure or under increased pressure.

The ketones employed may, for example, be acetophenone, benzalacetone or benzylacetone and the aldehydes employed may, for example, be cinnamicaldehyde or hydrocinnamic aldehyde. The solvents chosen are those which are partially miscible with water and contain no carbonyl group. It is particularly advantageous to use lower alcohols. Methanol is preferably used but ethyl alcohol or isopropylalcohol can also be used. The alcohols may be used in the anhydrous condition, but alcohols containing water may also be used, for example, 80% methanol.

Suitable hydrogenation catalysts are Raney nickel or noble metal catalysts, such as palladium hydroxide or barium sulphate or platinum black, preferably platinum oxide. Two mols of hydrogen are taken up in the hydrogenation. The aminoketone forming the starting material goes into solution and the desired compound of the general Formula I is produced in good yield. If the aldehyde or ketone employed contains readily hydrogenated double bonds in the residue R''', then the latter are saturated and a correspondingly greater quantity of hydrogen is taken up.

The reaction solutions are worked up in conventional manner. Since the end product of the general Formula IXa contains 3 asymmetric carbon atoms, for example, when starting from phenylacetone, benzal- or benzyl-acetone $$(R'''=—CH_2 \text{ or } CH_2—CH_2—, \quad R''''=CH_3)$$

the formation of 4 stereoisomeric racemates is possible.

Wherever hydrogenation is to be effectuated in conjunction with the preparation of any of the products or intermediary products herein referred to, such hydrogenation is advantageously carried out in the presence of suitable catalysts and preferably catalysts of the noble metal type. Especially good results are obtained using palladium. The products subjected to hydrogenation in the presence of noble metal catalysts are preferably the salts, thereby resulting in the formation of the corresponding salts of the desired compounds in accordance with the invention of the general Formula I.

When using nickel catalysts for hydrogenation purposes in accordance with the invention, and especially the lesser expensive nickel catalysts of, for instance, the Raney nickel type, the same selectively catalyze the hydrogenation reaction of the salts of the amino ketones of the general Formula II in a manner to smoothly split off the etherifying alcohol radical of the phenyl or phenyl methyl type without reducing the ketone group thus resulting in the formation of a phenol ketone having a free hydroxy group, i. e. a product of the general Formula II in which R'=H. Thus, for instance, when subjecting the hydrobromide of the benzyl ether of an amino ketone product of the general Formula II to hydrogenation in the presence of Raney nickel, the benzyl residue is readily split off. The reaction gives substantially quantitative yields of the amino ketone phenols.

In order to then produce from these latter products the amino hydroxy compounds generally corresponding to Formula I, hydrogenation may be continued with palladium as catalyst thereby reducing the ketone group to a secondary alcohol group. While it is possible to obtain the direct formation of the desired amino alcohols of the general Formula I by catalytically hydrogenating the amino ketones or their corresponding Schiff's base in the form of their salts in a substantially one step procedure using noble metal catalysts, the two step process may be used where special circumstances and conditions may at times make it desirable to produce the intermediary amino ketone phenols.

Within the preferred procedure of our invention, however, a substantially one step hydrogenation of the amino ketone ethers of the benzyl ether type to the desired amino hydroxy phenols may be carried out without the necessity of using a relatively costly catalyst such as of the noble metal type.

This result may be accomplished by hydrogenating the free amino ketone ether of the general Formula II in the form of the free base thereof in the presence of a nickel catalyst and preferably a catalyst of Raney nickel. The hydrogenation will then proceed in a smooth and rapid reaction producing the free base amino hydroxy phenol of the general Formula I. The most convenient way of obtaining the free bases is to utilize the salts of the amino ketone products and to treat the same with one equivalent of alkali per mol of the salt to be hydrogenated in the form of an alkali metal hydroxide or its corresponding alcoholate. Alternatively, the free bases as such may be used as they may have been obtained in any conventional manner including alkalinization of their salts and solvent extraction of the free base or by way of any method including those herein specified in which the free base as such is produced.

Whenever the two step manner of hydrogenating the amino ketones of the general Formula II is used, it is possible to conduct the second hydrogenation step, i. e. the hydrogenation of the intermediate amino ketone phenol, by the conversion of the salt thereof to the free base and proceeding with the hydrogenation of the latter in the presence of a nickel catalyst. Thus, when proceeding in the two step manner, the amino ketone, as exemplified by Formula II, is first hydrogenated in the form of its salt in the presence of a nickel catalyst, and hydrogenation is thereafter conducted in the presence of nickel catalyst in the form of the base of the intermediary product, which may be accomplished by adding a mol equivalent of a caustic alkali after the completion of the first hydrogenation step and then continuing the hydrogenation.

The following examples are furnished by way of illustration and not of limitation:

EXAMPLE I

*Preparation of 1-(p-hydroxyphenyl)-2-(γ-phenyl-propylamino)-propanol-(1)*

5 grams of the hydrobromide of 1-(p-hydroxyphenyl) - 2 - (γ - phenylpropylamino) propanone-(1) of melting point 174° C. were shaken in contact with hydrogen with 0.2 gram of platinum oxide in 100 ccs. of methanol. The hydrogenation stopped when 1 mol of hydrogen had been taken up. The solution was filtered from the catalyst, the methanol was evaporated and the residue was crystallized from alcohol with the addition of a little ether. The hydrobromide of the compound named in the example heading was obtained with a melting point of 174° C. It showed a marked melting point depression when melted with the starting material, which happens to melt at the same temperature.

The starting material is prepared as follows: p-benzoxy-α-bromo-propiophenone is prepared by benzylating p-hydroxypropiophenone with benzyl chloride and potassium carbonate in methanol and subsequent bromination. The product is then heated for one hour with 1 mol γ-phenyl-propyl-amine to 80° C. to form the hydrobromide of 1-(p-benzoxy phenyl) - 2- (γ-phenylpropylamino)-propanone-(1), of melting point 209–210° C. The latter is decomposed into toluene and the hydrobromide of 1-(p-hydroxyphenyl)-2-(γ - phenylpropylamino) - propanone-(1) by shaking in contact with hydrogen with a not too active palladium catalyst, for example, with palladium on barium sulphate in 90% methanol, 1 mol of hydrogen being taken up. The same compounds can also be obtained by heating p - hydroxy-phenyl-α-bromo-propiophenone, obtained as described by Auwers and Noll, Liebigs Annalen 535, p. 247 (1938) dissolved in benzene with γ-phenylpropylamine for an hour on the water bath.

EXAMPLE II

*Preparation of 1-(p-hydroxyphenyl)-2-(α-methyl-γ-phenyl-propylamino)-propanol-(1)*

5 grams of the hydrobromide of 1-(p-hydroxyphenyl) - 2 - (α-methyl-γ-phenyl-propylamino)-propanone-(1), of melting point 141° C. (crystallized from water) were shaken in 150 ccs. methanol with 1.5 grams of a 10% palladium hydroxide barium sulphate catalyst in contact with hydrogen. The hydrogenation ceased when 1 mol of hydrogen had been taken up. The solution was filtered from the catalyst and concentrated, and the hydrobromide of the compound named in the example heading was precipitated by addition of ether. It melted after recrystallization from alcohol at 214–215° C. and the free base liberated therefrom at 110–112° C. The starting material was obtained in a manner analogous to that described in Example I.

EXAMPLE III

*Preparation of 1-(p-hydroxyphenyl)-2-(α-methyl-γ-phenyl-propylamino)-propanol-(1)*

1 gram of 1-(p-hydroxyphenyl)-2-(α-methyl-γ-phenyl-propylamino)-propanone-(1) of melting point 147–148° C. were shaken with about 0.25 gram of Raney nickel in 25 ccs. methanol in contact with hydrogen. After four hours the quantity of hydrogen calculated for 1 mol had been taken up. The solution was filtered from the catalyst, and by evaporation and recrystallization of the residue from methanol 70% of the theoretical yield of the base specified in the example heading was obtained, having a melting point of 111–112° C. The mother liquor contained stereoisomeric compounds of the same constitution.

The starting material was obtained as described in Examples I and II and the base used as the starting material was liberated in the usual manner.

EXAMPLE IV

*Preparation of stereoisomeric 1-(p-hydroxyphenyl) - 2 - (α - methyl-γ-phenyl-propylamino)-propanol-(1)*

5.5 grams of the hydrobromide of a steroisomer of the compound mentioned in Example II, 1-(p-hydroxyphenyl)-2-(α-methyl-γ-phenyl - propylamino)-propanone-(1), of melting point 201° C. (crystallized from water) were used. This product was obtained by reacting toluene sulphonic acid ester of α-bromo-p-hydroxy-propiophenone with 1-phenyl-3-amino-butane, fractional crystallization of the hydrobromide produced and splitting off of the toluene sulphonic acid residue with alkali. The aforestated amount of the hydrobromide was shaken as in Example II with 2.0 grams of a 10% palladium hydroxide-barium sulphate catalyst in 125 ccs. methanol in contact with hydrogen. The hydrobromide of the hydrogenation product was isolated in the usual manner after 1 mol of hydrogen had been taken up, and melted after recrystallization from dilute hydrobromic acid at 215–216° C. The base liberated therefrom melted at 139–140° C. and the hydrochloride melted at 223–224° C.

The same compound was obtained when, instead of the hydrobromide, the free base of melting point 171–172° C. was hydrogenated with Raney nickel in methanol as in Example III. By way of alternative procedure, the base was hydrogenated in aqueous medium with the ketone starting material (melting point 171–172° C.) dissolved in 1 mol of aqueous potassium hydroxide and shaken with Raney nickel in contact with hydrogen.

EXAMPLE V

*Preparation of 1-(p-hydroxyphenyl)-2-(γ-phenyl-propylamino)-propanol-(1)*

2 grams of 1-(p-hydroxyphenyl)-2-(γ-phenyl-propylamino)-propanol-(1), substituted at the phenolic hydroxyl by a p-toluene sulphonyl residue, were heated for 3 hours on the water bath with an excess 10% alcoholic caustic potash solution, until the solution was no longer rendered turbid (by unchanged base) on addition of water. The aqueous medium was then worked up in the usual manner, to form an ethereal solution of the base specified in the example heading. The hydrobromide of melting point 174° C. was obtained from this base solution by addition of ethereal or aqueous hydrobromic acid. Any other salt may be obtained from the ether solution of the base by adding another acid of the type known to form salts with —NH— groups.

The starting material can be obtained by brominating the p-toluene sulphonic acid ester of p-hydroxypropiophenone, melting at 78° C. (which may be obtained from p-toluene sulphenol chloride and p-hydroxypropiophenone in pyridine as described by Sekera and Marvel, Journ. Amer. Chem. Soc. 55, p. 345 (1933)) to form the α-bromo compound melting at 75° C., reacting this with β-phenylpropylamine and reducing the ketone group.

EXAMPLE VI

*Preparation of 1-(p-hydroxyphenyl)-2-(α-methyl-γ-phenyl-propylamine)-propanol-(1)*

9.3 grams of the compound specified in the example heading, but substituted at the phenolic hydroxyl by the toluene sulphonyl residue, were saponified as in Example V with 50 ccs. of 10% alcoholic caustic soda. The base specified in the heading, of melting point 111–112° C., was obtained by working up in the usual manner. The hydrochloride melts at 222–224° C. and at 205–206° C. when it contains 1 molecule of water of crystallization.

The starting material was obtained by reacting the toluene sulphonic acid ester of α-bromo-p-hydroxypropiophenone, mentioned in Example V, in benzene with 1-phenyl-amino-butane, converting the precipitated hydrobromide of melting point 217–220° C. (after crystallization from methanol) into the free base melting at 70–71° C. and reducing the ketone group with aluminum isopropylate by the Meerwein-Ponndorf method, the toluene sulphonyl residue surprisingly not being split off. By working up in the usual manner the hydrochloride of 1-(p-hydroxyphenyl)-2-(α-methyl-γ-phenyl-propylamino)-propanol-(1), substituted at the phenolic hydroxyl by the p-toluene sulphonyl residue, was obtained and melted at 228–230° C. It gives with alkali the free base of melting point 135–136° C. which is then saponified.

EXAMPLE VII

*Preparation of 1-(p-hydroxyphenyl)-2-(α-methyl-γ-phenyl-propylamino)-propanol-(1)*

2.8 grams of the benzyl ether of the compound specified in the example heading, of melting point 135–136° C. (crystallized from methanol), were shaken with 1.0 gram of a palladium hydroxide barium sulphate catalyst, in a mixture of equal parts of methanol and ethanol in contact with hydrogen. The benzyl residue was split off from the phenolic hydroxyl group to form toluene within 30 minutes, 1 mol of hydrogen being taken up. The base specified in the example heading, which melts at 110–112° C., was obtained by working up in the usual manner.

The benzyl ether required as starting material was obtained by brominating the benzyl ether of p-hydroxypropiophenone, reacting the α-bromo compound with 1 mol of 1-phenol-3-aminobutane, preferably in the absence of solvents, and either hydrogenating the hydrobromide in the presence of diethylamine in methanol with platinum oxide, or reducing by the Meerwein-Ponndorf method the base liberated from the hydrobromide. In both cases the benzyl residue was not split off from the phenolic hydroxyl.

EXAMPLE VIII

*Preparation of 1-(p-hydroxyphenyl)-2-(α-methyl-γ-phenyl-propylamino)-propanol-(1)*

15 grams of the hydrobromide of 1-(p-benzoxy-phenyl-2-(α-methyl-γ-phenyl-propylamino)-propanone-(1) which melts at 235–237° C. with decomposition, were suspended in 500 ccs. of very pure methanol and shaken with 6.0 grams of a 10% palladium hydroxide barium sulphate catalyst in contact with hydrogen. After rather more than 2 mols of hydrogen had been taken up, the hydrogenation stopped. The hydrobromide of the base specified in the heading, melting at 214–215° C., was obtained in excellent yield by filtering off from the catalyst, washing with methanol and evaporation. 25 ccs. of a freshly prepared palladium chloride solution, to which 9 grams of charcoal has been added, may be used as the catalyst instead of palladium hydroxide.

The starting material was obtained by heating equivalent quantities of p-benzoxy-α-bromo-propiophenone and 1-phenyl-3-amino-butane for an hour on the water bath in the absence of solvents. A solid crystalline cake was obtained, which was the compound used as the starting material. After being extracted with boiling acetic acid, it can be adjusted directly to hydrogenation.

By reacting the corresponding aralkylamines instead of the phenyl amino butane here specified and subjecting the various resulting benzyl ethers to catalytic hydrogenation in the manner set forth above, the following compounds were prepared:

1-(p-hydroxyphenyl)-2-(β-phenyl-ethylamino)-propanol-(1); melting point of the hydrochloride 195° C.

1-(p-hydroxyphenyl)-2-(α-phenyl-ethylamino)-propanol-(1); melting point of the hydrobromide 208–209° C., of the hydrochloride 211–212° C., and of the base 115–116° C.

1-(p-hydroxyphenyl)-2-(α-methyl-β-phenyl-ethylamino)-propanol-(1); melting point of the hydrobromide 216° C.

1-(p-hydroxyphenyl)-2-γ-phenylpropylamino)-propanol-(1); melting point of the hydrochloride 178–179° C.

1-(p-hydroxyphenyl)-2-(β-phenyl-butylamino)-propanol-(1); melting point of the hydrochloride 143–145° C., and 1-(p-hydroxyphenyl)-2-(α-methyl-β-phenyl-butylamino)-propanol-(1).

The last mentioned compound was obtained in the form of the steroisomeric hydrochlorides, which may be separated by fractional crystallization. The less soluble hydrochloride melts at 222–223° C. and the more soluble melts at 185–186° C.

EXAMPLE IX

*Preparation of 1-(p-hydroxyphenyl)-2-(α-methyl-γ-phenyl-propylamino)-propanol-(1)*

8 grams of the hydrobromide of 1-(p-benzoxy-phenyl)-2-(α-methyl-γ-phenyl-propylamino)-propanone-(1), produced as described in Example VIII and purified by twice boiling with five times the quantity of acetic acid and filtration at 80° C., were shaken in contact with hydrogen with 0.8 gram of Raney nickel in 70 ccs. of pure methanol containing 0.96 gram (corresponding to 1 mol) of KOH. After four hours 2 mols of hydrogen had been taken up and the solution was filtered from the catalyst, evaporated in vacuo, and the residue triturated first with water to remove potassium bromide and then with methanol to remove potassium bromide. 3.7 grams (72% of the theoretical yield) of the compound specified in the heading, melting at 110–112° C. were obtained. The remainder of the base remains in the methanol mother liquor as a mixture of stereoisomers.

When the alkali was omitted in the above-described process only one mol of hydrogen was taken up rapidly, which served to split off the benzyl residue. The hydrobromide which was originally in suspension went into solution but the hydrogenation slowed down very markedly. When one equivalent of KOH was added to the solution, hyrogenation was immediately resumed. The yield obtained by this process was practically the same as when the alkali was added initially, and an excess of alkali may be used.

EXAMPLE X

*Preparation of 1-(p-hydroxyphenyl)-2-(β-phenyl-ethylamino)-propanol-(1)*

1-(p-hydroxyphenyl)-propanedione-(1.2) of melting point 85°, was shaken with 1 mol of β-phenyl-ethylamine and palladium hydroxide barium sulphate catalyst in methanol in contact with hydrogen. After 2 mols of hydrogen had been taken up, the solution was worked up in the usual manner, and the base produced was converted into the hydrochloride, which melted at 195° C. after recrystallization from alcohol with addition of ether.

EXAMPLE XI

*Preparation of 1-(p-hydroxyphenyl)-2-(α-methyl-γ-phenyl-propylamino)-propanol-(1)*

8.3 grams of 1-(p-hydroxyphenyl)-2-amino-propanol-(1) of melting point 161–162° C. were dissolved with 21 grams of benzyl acetone in 20 ccs. of anhydrous alcohol and 5 ccs. of benzene, and the whole was heated beneath a reflux condenser (with take-off and filled with rings) for three hours on the water bath, when the greater part of the solvent distilled off. The residue was taken up in 60 ccs. of pure alcohol, 0.3 gram of platinum oxide were added, and the solution shaken in contact with hydrogen. When hydrogen was no longer taken up, the solution was filtered from the catalyst, the alcohol was distilled off, the residue was taken up in methylene chloride, and the solution was shaken with dilute hydrochloric acid. Fifteen g. of a mixture of hydrochlorides crystallized out having a crude melting point of 206–208° C.

The mixture contains two isomers of the constitution specified in the example heading, which melt respectively as free bases at 111–112° C. and 139–140° C. The two isomers are distinguished by stereoisomerism at the asymmetrical carbon atom of the aralkyl residue.

The 1-(p-hydroxyphenyl)-2-amino-propanol-(1) required as starting material may be obtained in various ways, for example, by reduction of the isonitroso compound of p-hydroxy-propiophenone. It may be obtained particularly conveniently by acetylating p-hydroxy-propiophenone, brominating the acetyl compound, reacting the α-bromo compound with concentrated aqueous ammonia, whereupon 1-(p-hydroxyphenyl)-2-amino-propanone-(1) melting at 168–170° C. crystallizes out, and hydrogenating the latter catalytically in aqueous suspension. By evaporating the aqueous solution produced and recrystallization from alcohol, 1-(p-hydroxyphenyl)-2-amino-propanol-(1) is obtained in very good yield.

EXAMPLE XII

*Preparation of 1-(p-hydroxyphenyl)-2-(α-phenyl-ethylamino)-propanol-(1)*

This compound was obtained as described in Example XI from 1-(p-hydroxyphenyl)-2-amino-propanol-(1) and acetophenone. The hydrochloride melts at 211–212° C. (recrystallized from water).

EXAMPLE XIII

*Preparation of 1-(p-hydroxyphenyl)-2-(α-methyl-γ-phenyl-propylamino)-propanol-(1)*

1.7 grams of 1-(p-hydroxyphenyl)-2-amino-propanol-(1) were heated beneath a ring condenser on the water bath with 1.5 grams of benzyl acetone in 10 ccs. of alcohol and 2 ccs. of benzene for 3 hours and the residue was evaporated several times with ether. The residue was then dissolved in an alcohol-ether mixture (1:10), amalgamated aluminum was added to the solution and the latter boiled for 18 hours under reflux, a drop of water being added from time to time in order to maintain the evolution of hydrogen. The solution was filtered hot and the hydrochloride was precipitated with hydrochloric acid. The hydrochloride melted at 213–214° C. after recrystallization from alcohol-ether and water. It was identical with the hydrochloride of the base melting at 111–112° C. described in Example II.

EXAMPLE XIV

*1-(p-hydroxyphenyl)-2-(α-methyl-γ-phenyl-propylamino)-propanol-(1)*

30 grams of 1-(p-hydroxyphenyl)-2-amino-propanone-(1) of melting point 168–170° C. (containing 2 molecules of water of crystallization) were suspended in 130 ccs. pure methanol and after addition of 27 grams of benzyl acetone and 0.5 grams of platinum oxide the whole was shaken in contact with hydrogen. After 6 to 8 hours rather more than 2 mols of hydrogen had been taken up; the hydrogenation then came practically to a standstill. The solution was worked up in the usual manner, for example, by concentrating in vacuo after acidification with hydrochloric acid and boiling the residue with 70 ccs. of acetone and 80% of the theoretical yield was obtained of a mixture of the hydrochloride of equal parts of the bases melting at 111–112° C. and 139–140° C.

Ethanol can be used as the solvent, instead of methanol, with the same result, but the hydrogenation takes rather longer. Instead of 0.5 gram of platinum oxide, 10 grams of a 10% palladium hydroxide barium sulphate catalyst or 25 grams of Raney nickel can be used, and in this case hydrogenation is effected under raised pressure to accelerate the taking up of hydrogen.

EXAMPLE XV

*Preparation of 1-(p-hydroxyphenyl)-2-(α-methyl-γ-phenyl-propylamino)-propanol-(1)*

30 grams of 1-(p-hydroxyphenyl)-2-amino-propanone-(1) were hydrogenated as described in Example XIII, but an equal quantity of benzal acetone was used instead of 27.0 grams of benzyl acetone. More than 3 mols of hydrogen were taken up. Working up yielded a mixture of hydrochlorides, having a crude melting point of 210–211° C., the yield and the composition being the same as in Example XIV.

EXAMPLE XVI

*Preparation of 1 - (p - hydroxyphenyl) - 2 - (γ-phenyl-propylamino) -propanol-(1)*

3 grams of 1 - (p - hydroxyphenyl) -2-aminopropanone-(1) (melting point 168° C. with 2 mols of water of crystallization) were shaken in contact with hydrogen in 37 ccs. methanol with 2.5 grams of freshly distilled hydrosuccinaldehyde and 0.3 gram of platinum oxide. After about 2 hours hydrogen was no longer taken up. The solution was filtered from the catalyst, the filtrate was acidified with concentrated hydrochloric acid and evaporated to dryness in vacuo. The residue was triturated with acetone and gave the hydrochloride of the compound specified in the example heading of melting point 174–175° C. 80% aqueous methanol can be used with the same success as anhydrous methanol.

EXAMPLE XVII

*1-(p-hydroxyphenyl)-2-(α-methyl - γ - phenyl-propylamino)-butanol-(1)*

2 g. of the hydrochloride of 1-(p-benzylhydroxyphenyl) - 2 - (α - methyl - γ - phenyl - propyl-amino)-butanol-(1) of melting point 202° C. in 50 cc. of methanol was shaken with 1 g. of 2% palladium-barium sulphate catalyst under hydrogen until no more hydrogen was taken up. The absorption of hydrogen corresponded to 1 mol. The filtrate was concentrated in vacuo and the hydrochloride of the phenol base was obtained by precipitation with ether, which base after crystallization from methanol had a melting point of 200° C.

The initial material was prepared in the following manner: 1-p-benzylhydroxy - butyrophenone was brominated in known manner and reacted with 1-phenyl-3-aminobutane to produce a stereoisomeric mixture of 1-(p-benzylhydroxyphenyl)-2-(α-methyl - γ - phenyl-propylamino) -butanone, which was separated by fractional crystallization of the hydrochloride. By hydrogenation of the free base with platinum oxide (PtO₂) in methanol the two stereoisomeric 1-(p-benzylhydroxyphenyl) - 2 - (α-methyl-γ-phenyl-propylamino)-butanols-(1) were obtained.

EXAMPLE XVIII

*1-(p-hydroxyphenyl) - 2 - (α-methyl-γ-phenyl-propylamino)-butanol-(1)*

10 g. of the hydrochloride of the stereoisomer 1-(p-benzylhydroxyphenyl) - 2 - (α - methyl-γ-phenylpropylamino) - butanol - (1) of melting point 156° C. were hydrogenated as in Example I and 5 g. of the hydrochloride of 1-(p-hydroxyphenyl) -2-(α-methyl-γ-phenyl - propylamino) - butanol-(1) were isolated. After re-crystallization from methanol the melting point was 200° C.

EXAMPLE XIX

*1-(p-hydroxyphenyl)-2-(α-methyl - β - phenyl-ethylamino)-butanol-(1)*

18.1 g. of 1-(p-hydroxyphenyl)-2-amino-1-butanol (Chemisches Centralblatt (1932), II, 91) was suspended in 50 cc. of methanol and 13.4 g. of phenyl acetone in 100 cc. of methanol were mixed with the solution and immediately shaken in the presence of 0.2 g. of platinum oxide (PtO₂) under hydrogen until no more hydrogen was taken up. The absorption amounted to 1.05 mols. The filtrate from the catalyst was freed from methanol in vacuo, the radical dissolved in ether, the undissolved portion filtered off and the mixture of stereoisomeric hydrochlorides obtained by the addition of etheric hydrogen chloride in a yield of 25 g. from which by fractional crystallization one of the two stereoisomeric hydrochlorides was obtained pure with a melting point of 230° C.

EXAMPLE XX

*1 - (p - hydroxyphenol) - 2 - (γ - phenyl-propyl-amino) -butanol-(1)*

18.1 g. of 1-(p-hydroxyphenyl)-2-amino-1-butanol was suspended in 100 cc. of methanol and shaken with 0.3 g. of platinum oxide (PtO₂) under hydrogen and during three-quarters of an hour a methanolic solution of 13.4 g. of phenyl-propionaldehyde was added dropwise. After one-and-a-half hours the absorption of hydrogen ceased, the absorption being 1.9 mols of hydrogen. The filtrate from the catalyst was freed from the solvent in vacuo, the radical was taken up in ether and a well-crystallizing hydrochloride was obtained with etheric hydrogen chloride which after re-crystallization from absolute alcohol was obtained in a yield of 19 g. and a melting point of 208° C.

EXAMPLE XXI

*1-(p - hydroxyphenyl) - 2 - (γ - phenyl - butyl-amino) -butanol-(1)*

15.5 g. of 1-(p-hydroxyphenyl)-2-(γ-phenyl-butylamino)-butanone of melting point 151° C. was dissolved in 170 cc. of methanol at 50° C. and shaken with 2 g. of 2% palladium-barium sulphate catalyst under hydrogen until no more hydrogen was taken up. The absorption ceased after 1.1 mols of hydrogen had been absorbed. The filtrate from the catalyst was brought to dryness in vacuo, the radical dissolved in ether, filtered from the undissolved portion and the hydrochloride of 1-(p-hydroxyphenyl) - 2 - (γ-phenyl-butylamino)-butanol-(1) was obtained with etheric hydrogen chloride in a yield of 80% of the theoretical which, after re-crystallization, had a melting point of 192° C.

EXAMPLE XXII

*1-(p-hydroxyphenyl) - 2 - (α-methyl-α-phenyl-methylamino)-butanol-(1)*

14.2 g. of 1-(p-hydroxyphenyl)-2-(α-methyl-α-phenyl-methylamino)-butanone of melting point 181–182° C. was dissolved in 150 cc. of methanol at 50° C. and shaken with 3 g. of a 2% palladium-barium sulphate catalyst under hydrogen until no more hydrogen was taken up. The absorption amounted to exactly 1 mol. The working up was carried out as in Example XX. The hydrochloride of the desired compound was re-crystallized from aqueous alcohol and had a melting point of 209–210° C.

The initial material for Examples XXI and XXII is easily obtained by the reaction of p-benzylhydroxy-α-brom-butyro-phenone with 1-phenyl-4-amino-butane or with α-phenyl-ethylamine to form 1-(p-benzylhydroxyphenyl)-2-γ-phenyl-butylamino)-butanone (melting point of the hydrochloride about 193° C.) or to form 1-(p - benzylhydroxyphenyl) - 2 - (α - methyl-α-phenyl methyl-amino)-butanone (melting point

We claim:

1. An aralkylamino alkane product of the group consisting of the acid addition salts and free base represented by the general formula for the base

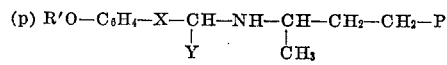

in which X is a member of the group of radicals consisting of —CO— and —CHOH—, in which R' is a member of the group consisting of hydrogen and a phenyl methyl radical, in which P is a member of the group consisting of phenyl and a methyl phenyl radical, and in which Y is an alkyl radical of from 1-2 C atoms.

2. The product in accordance with claim 1 in which the same is the free base, in which X is the —CO—radical, in which R' is hydrogen and in which P is the phenyl radical.

3. The product in accordance with claim 1 in which the same is an acid addition salt, in which X is the —CO— radical, in which R' is hydrogen and in which P is the phenyl radical 4. An aralkylamino alkane base represented by the general formula

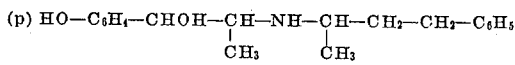

5. An aralkylamino alkane acid addition salt represented by the general formula for the base

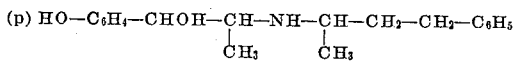

6. The product in accordance with claim 5 in which said salt is the hydrochloride of said base.

7. The product in accordance with claim 5 in which said salt is the hydrobromide of said base.

8. In the production of an aralkylamino alkane product the improvement which comprises hydrogenating, in the presence of a Raney nickel catalyst, a member of the group consisting of the acid addition salt and free base of a ketone represented by the general formula

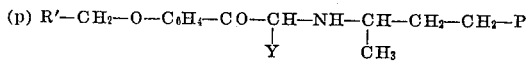

in which R' represents a phenyl radical, in which P is a member of the group consisting of phenyl and a methyl phenyl radical and in which Y is a member of the group consisting of methyl and ethyl radicals.

9. In the production of an aralkylamino alkane product the improvement which comprises hydrogenating, in the presence of a Raney nickel catalyst, the acid addition salt of a ketone represented by the general formula for the base

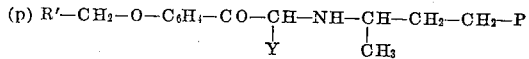

in which R' represents a phenyl radical, in which P is a member of the group consisting of phenyl and a methyl phenyl radical and in which Y is a member of the group consisting of methyl and ethyl radicals to thereby convert said

group into a free OH group, and thereafter hydrogenating, in the presence of a noble metal catalyst, the resulting hydroxy ketone to thereby convert the CO group into a CHOH group.

10. In the production of an aralkylamino alkane product the improvement which comprises hydrogenating in the presence of Raney nickel catalyst the free base of a ketone represented by the general formula

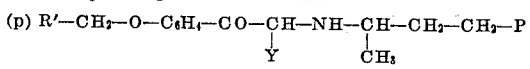

in which R' represents a phenyl radical, in which P is a member of the group consisting of phenyl and a methyl phenyl radical, and in which Y is a member of the group consisting of methyl and ethyl radicals, to thereby convert said CO group into a CHOH group and said

group into a free OH group.

11. The improvement in accordance with claim 9 in which said hydrogenation is carried out using at least one mol equivalent of one member of the group consisting of alkali metal hydroxide and alkali metal alcoholate.

12 In the production of an aralkylamino alkane product the improvement which comprises hydrogenating in the presence of a hydrogenation catalyst a suspension of 1-(p-hydroxyphenyl)-2-amino-propanone-(1) in an organic solvent, in which said propanone is but limitedly soluble, in the presence of 4-phenyl-butanone-(2).

13. Improvement in accordance with claim 12 in which said organic solvent is methanol.

14. Improvement in accordance with claim 12 in which said catalyst comprises platinum oxide.

15. Improvement in accordance with claim 14 in which said organic solvent is methanol.

IDA KÜLZ,
ANNEMARIE KÜLZ,
WALBURGA KÜLZ,
FRIEDRICH LEHMANN,
Administrators of the estate of Fritz Külz, deceased.

CLEMENS SCHÖPF.

References Cited in the file of this patent

UNITED STATES PATENTS

| Number | Name | Date |
|---|---|---|
| 2,061,136 | Bockmuhl | Nov. 17, 1936 |

FOREIGN PATENTS

| Number | Country | Date |
|---|---|---|
| 669,574 | Great Britain | Apr. 2, 1952 |
| 968,273 | France | Apr. 12, 1950 |
| 1,001,547 | France | Oct. 24, 1951 |